Figure 1:
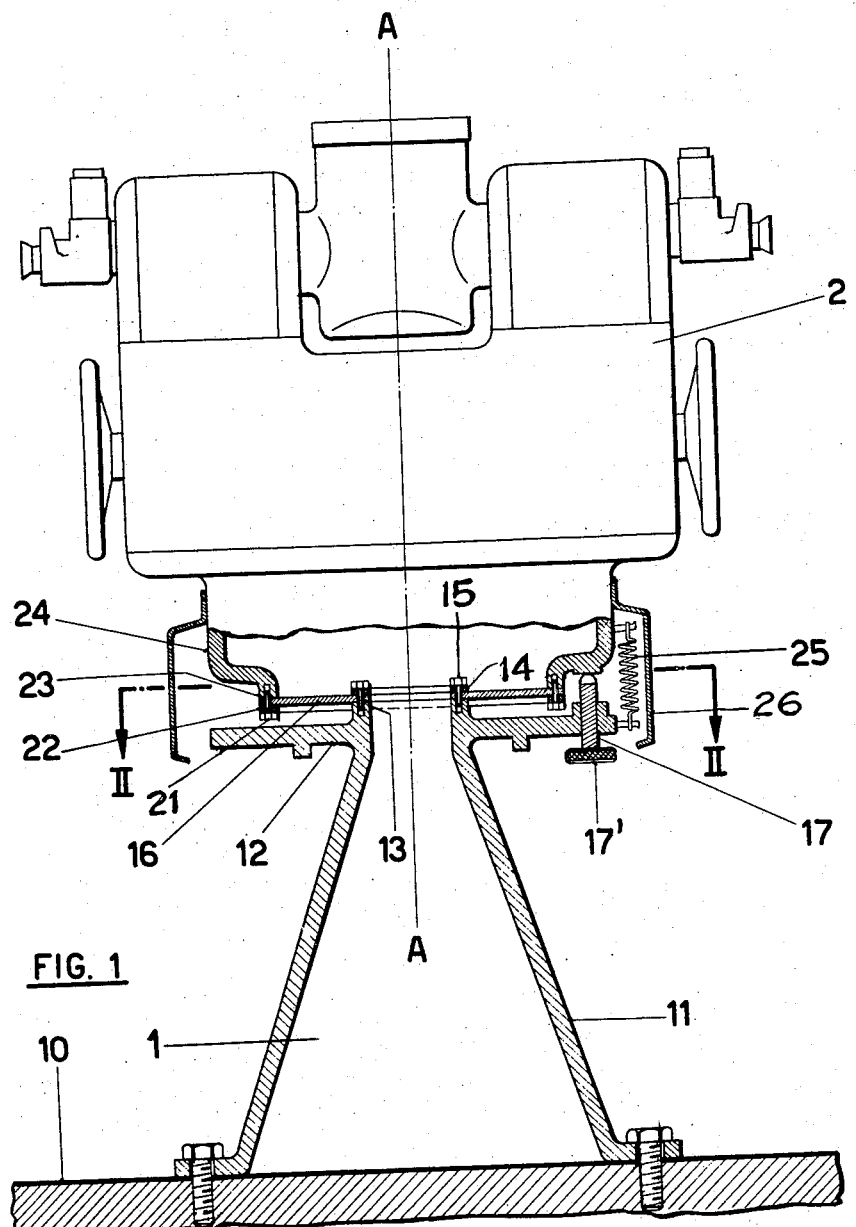

INVENTOR:
FRANZ W. BAUR

United States Patent Office 2,873,936
Patented Feb. 17, 1959

2,873,936

SUPPORTING DEVICE

Franz W. Baur, St.-Aubin Sauges, Switzerland, assignor to Firma Contraves A. G., Zurich, Switzerland Application December 15, 1953, Serial No. 398,389

3 Claims. (Cl. 248—180)

The present invention relates to a supporting device. More particularly, the present invention relates to an adjustable support arrangement for supporting a measuring instrument, such as a theodolite.

It is an object of the present invention to provide a supporting arrangement of the above type which affords accurate operation of the measuring instrument.

It is another object of the present invention to provide a support arrangement of the above type including a leveling device for a measuring instrument having a stationary pedestal or base portion and an instrument portion articulated thereto.

It is still another object of the present invention to provide a leveling device as aforesaid which permits the accurate adjustment of the measuring instrument into a predetermined reference position, and which permits the correction of small errors in the orientation of the measuring instrument after putting the same on the base portion.

It is a particular object of the present invention to provide a leveling device as aforesaid which provides an articulation between the adjustable portion and the stationary portion, which allows the adjustment movements required in the direction of leveling, but excludes any movement in a plane perpendicular thereto.

Other objects and advantages will become apparent from the following description and the appended claims.

The present invention is particularly concerned with leveling devices of the type referred to wherein the length of the adjustment movements required is short but wherein yet an articulated connection between a stationary and a moveable portion is required. Usually three leveling supports adjustable in a leveling direction are provided, for example leveling screws which allow slight tilting of the geometrical central axis of the instrument in all directions. The articulation joints hitherto used for leveling devices, such as journal bearings, knife edge or point-bearings show an unavoidable play as regards movements of the moveable component of the device in a plane perpendicular to the direction of leveling. Such horizontal movements cause the deterioration of the accuracy of measuring which is attainable with the measuring instrument, even when such detrimental shifting movements are small.

The present invention is designed to overcome the above mentioned difficulties, and to afford the objects stated above.

With the above objects in view, the present invention mainly comprises in combination: a stationary base portion, a moveable instrument portion, leveling supports adjustably mounted on the said base portion parallel to one another and supporting the said instrument portion, and a resilient diaphragm plate arranged in a plane perpendicular to the direction of adjustment of the said leveling supports and articulating the said instrument portion to the said base portion, the said diaphragm plate permitting movements in the said direction of adjustment only, and excluding movements perpendicular thereto.

Preferably in accordance with the present invention the said stationary base portion includes a vertical pedestal column, a horizontal platform arranged on the top of the said platform, while the said moveable instrument portion includes a downwardly directed flange ring coaxially arranged to the said flange ring of the said stationary base portion, and the said resilient diaphragm plate is of sheet metal and of annular shape, connected to the said two flange rings at its inner and outer circumference, respectively; the number of the said leveling supports is preferably three, and the same are distributed over a pitch circle of the said platform; in accordance with another preferred feature of the invention prestressed springs are provided which connect and draw towards one another the said stationary base portion and moveable instrument portion providing a constant positive connection of these two portions with one another, regardless in which direction act the resilient forces deriving from the deformation of the said resilient membrane by the said adjustment movements. The said prestressed springs are preferably so arranged as to pull the said moveable instrument portion towards the said leveling supports.

Figure 2:
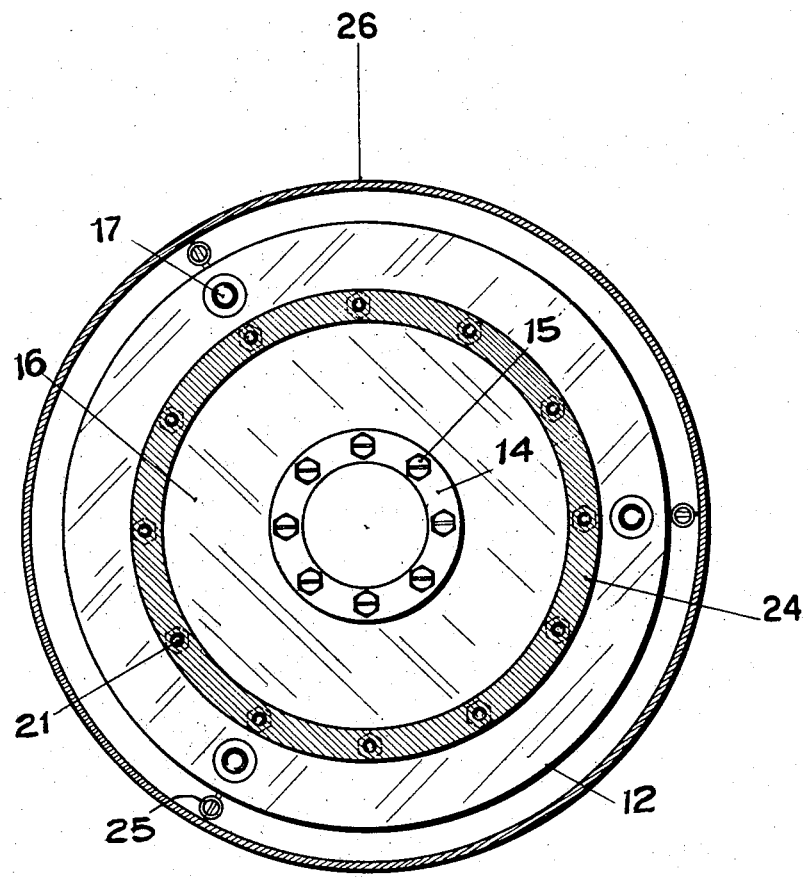

The novel features which are considered as characteristic for the invention are set forth in particular in the appended claims. The invention itself, however, both as to its construction and its method of operation, together with additional objects and advantages thereof, will be best understood from the following description of a specific embodiment thereof when read in connection with the accompanying drawings, in which:

Fig. 1 is a part-sectional elevation of a surveying instrument put on a base portion, according to the invention; and Fig. 2 is a plan view in section along the line II—II of Fig. 1, on an enlarged scale.

Fig. 1 shows a base portion 1 on which a surveying instrument 2, for example a theodolite is mounted. In order to attain accurate measurement results, the surveying instrument 2 is made moveable with respect to the base portion, and a leveling device makes it possible to adjust the geometrical central axis A—A of the surveying instrument accurately in to a vertical position in order that the surveying operations may be carried out in a faultless manner.

According to Fig. 1 for example a pedestal column 11 connects a concrete base 10 to a rigid upper platform 12 and a flange ring 13, on which by means of a counter-ring 14 and of screws 15 the inner edge of an annular diaphragm plate 16 is clamped fast. This diaphragm plate 16 consists of spring steel sheet in order that it may yield to deformation forces acting perpendicular to its plane while not yielding to deformation forces acting in its plane. The outer edge of this annular diaphragm plate 16 is clamped fast by means of a ring 22 and of clamping screws 21 to a downwardly directed flange ring 23 on the underside 24 of the surveying instrument casing. On the platform 12 of the pedestal column three leveling supports are equally distributed over a pitch circle, which supports consist according to Fig. 1 each of an adjustment screw 17, the heads 17' of which are accessible from the underside of the platform, and on the tops of which rests the underside of the casing 24 of the surveying instrument so that a three-point-support of the surveying instrument 2 on the pedestal 1 results.

Tension springs 25 tend to pull the casing 24 of the surveying instrument towards the platform 12 of the pedestal column, i. e. against the tips of the adjustment screws 17. A protective sleeve 26 of sheet metal prevents the penetration of impurities into the device. When with such a leveling instrument one of the adjustment screws 17 is adjusted slightly higher or lower, no displacements of the measuring instrument in the horizontal plane can result, because the diaphragm 17 does not permit any displacements in its own plane. It forms an articulated joint between the stationary and the moveable portion of the surveying instrument, which affords with the simplest possible structural means absolute freedom from play in all directions transverse to the leveling directions. Accordingly it does not permit any horizontally or tangentially directed displacements of the measuring instrument relative to the pedestal column as might cause faulty measurements.

The tension springs 25 effect permanently a positive contact of the measuring instrument with the leveling device, i. e. with the screws 17, and have also the effect that the play in the screw threads thereof can never act detrimentally. Thereby it is attained that the resiliency of the annular diaphragm can be used for the leveling on both sides of the relaxed position whereby for a given thickness of the diaphragm an increased range of leveling is attained. It is consequently not possible that the casing of the measuring instrument may detach itself from any one of the leveling screws under the influence of the so called plate-buckling effect which occurs at certain deformations of diaphragm plates.

Obviously the casing 24 could be made to rest on three supports which can be freely adjusted vertically each by means of a crude and of a fine-adjustment screw.

It will be understood that each of the elements described above, or two or more together, may also find a useful application in other types of support structures differing from the type described above.

While the invention has been illustrated and described as embodied in a support for a surveying instrument, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims:

What is claimed as new and desired to be secured by Letters Patent, is:

1. A leveling device for a measuring instrument, comprising in combination: a stationary base portion including a vertical pedestal column, a horizontal platform on the top of the said pedestal column and an upwardly directed flange ring provided on top of the said platform; a moveable instrument portion including a downwardly directed flange ring coaxially with the said flange ring of the said stationary base portion, an annular resilient sheet metal diaphragm extending in a plane perpendicular to the said column and connected at the inner circumference thereof to one of said flange rings and at the outer periphery thereof to the other of said flange rings, and three leveling supports adjustably mounted parallel to one another and distributed over a pitch circle of the said platform and supporting the said instrument portion, the said annular diaphragm permitting movements in the direction of adjustment only, and excluding movements perpendicular thereto.

2. A leveling device for a measuring instrument, comprising in combination: a stationary base portion, a moveable instrument portion, leveling supports adjustably mounted on the said base portion parallel to one another and supporting the said instrument portion, a resilient diaphragm plate extending in a plane perpendicular to the direction of adjustment of the said leveling supports fixed at the outer periphery thereof to one of said portions and at the inner periphery thereof to the other of said portions and articulating the said instrument portion to the said base portion, the said diaphragm plate permitting said movements in the said direction of adjustment only, and excluding movements perpendicular thereto, and prestressed springs connected at one end to the said moveable instrument portion and at the other end thereof to the said stationary base portion and tending to force the said moveable instrument portion in the direction parallel to the leveling adjustment movements against said leveling supports on the said stationary base portion so as to provide a constant positive connection of said stationary base portion with said movable instrument portion, regardless of the direction in which act the elastic forces deriving from the deformation of the said resilient diaphragm by the said adjustment movements.

3. A leveling device for a measuring instrument comprising, in combination, a stationary base portion; a movable instrument portion; leveling supports adjustably mounted on said base portion parallel to one another and supporting said instrument portion; a resilient diaphragm plate fixedly attached at spaced portions thereof to said base portion and to said instrument portion, respectively, and being in a plane perpendicular to the direction of adjustment of said leveling supports and articulating said instrument portion to said base portion, said diaphragm plate permitting only movements in said direction of adjustment and excluding movements perpendicular thereto; and prestressed tension springs attached with their free ends respectively to said movable instrument portion and to said stationary base portion and tending to pull said movable instrument portion in a direction parallel to the leveling adjustment movements against said stationary base portion thus providing a constant positive connection of these two portions with one another, regardless of the direction in which the elastic forces deriving from the deformation of said resilient diaphragm by said adjustment movements act.

References Cited in the file of this patent

UNITED STATES PATENTS

| 791,682 | Fall | June 6, 1905 |
| 1,807,919 | Kolster | July 2, 1931 |
| 2,248,209 | Vacquier et al. | July 8, 1941 |
| 2,461,190 | Wolff | Feb. 8, 1949 |

FOREIGN PATENTS

| 71,730 | Germany | June 5, 1892 |